US011448785B2

United States Patent
Ma et al.

(10) Patent No.: US 11,448,785 B2
(45) Date of Patent: Sep. 20, 2022

(54) METHODS AND SEISMIC SHOT GENERATION AND DATA COLLECTION SYSTEMS UTILIZING REFRACTION IN HORIZONTAL STRATIFIED MEDIA FOR MONOTONICALLY INCREASED VELOCITY DETERMINATIONS

(71) Applicant: Saudi Arabian Oil Company, Dhahran (SA)

(72) Inventors: Yue Ma, Beijing (CN); Yi He, Beijing (CN); Tong Wang Fei, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 3 days.

(21) Appl. No.: 17/160,683

(22) Filed: Jan. 28, 2021

(65) Prior Publication Data
US 2022/0236434 A1   Jul. 28, 2022

(51) Int. Cl.
*G01V 1/28* (2006.01)

(52) U.S. Cl.
CPC .......... *G01V 1/282* (2013.01); *G01V 2210/12* (2013.01); *G01V 2210/142* (2013.01); *G01V 2210/6222* (2013.01)

(58) Field of Classification Search
CPC ......... G01V 2210/12; G01V 2210/142; G01V 2210/622; G01V 1/282
See application file for complete search history.

(56) References Cited

U.S. PATENT DOCUMENTS

| | | | |
|---|---|---|---|
| 7,636,275 B2 * | 12/2009 | Anno | G01V 1/308 367/21 |
| 10,267,934 B2 | 4/2019 | Wang et al. | |
| 10,386,513 B2 * | 8/2019 | Aarre | G01V 1/345 |
| 11,221,425 B1 * | 1/2022 | He | G01V 1/308 |
| 2011/0115787 A1 | 5/2011 | Kadlec | |

FOREIGN PATENT DOCUMENTS

| | | |
|---|---|---|
| CN | 109100798 A | 12/2018 |
| CN | 112083486 A | 12/2020 |

OTHER PUBLICATIONS

Vandenberghe et al., "Semidefinite Programming", Society for Industrial and Applied Mathematics, vol. 38, No. 1, pp. 49-95, Mar. 1996.
Sheriff, Robert F. and Geldart, Lloyd P. "Seismic Velocity", in Exploration Seismology, Cambridge University Press, 2 edition, Chapter 5, pp. 107-143, 1995.

(Continued)

Primary Examiner — Elias Desta
(74) Attorney, Agent, or Firm — Dinsmore & Shohl, LLP (57) ABSTRACT

Methods and seismic shot generation and data collection systems configured to determine a monotonically increased velocity v*(z) from a monotonically increased velocity model by requiring the monotonically increased velocity v*(z) to be nearest to a refraction velocity v(z) determined for an estimated depth z and to be characterized by a positive slope such that the refraction velocity v(z) increases with depth, and to generate a subsurface image based on the estimated depth z and the determined monotonically increased velocity v*(z).

14 Claims, 6 Drawing Sheets

(56) References Cited

OTHER PUBLICATIONS

Notification of Transmittal of the International Search Report and Written Opinion of the International Searching Authority, or the Declaration dated Apr. 26, 2022 pertaining to International application No. PCT/US2022/013052 filed Jan. 20, 2022, pp. 1-19.

Novotný, et al. "Depth-Recursive Tomography Along the Eger Rift Using the S01 Profile Refraction Data: Tested at the KTB Super Drilling Hole, Structural Interpretation Supported by Magnetic, Gravity and Petrophysical Data", Surveys in Geophys, May 26, 2009, pp. 561-600, vol. 30, No. 6, Kluwer Academic Publishers, DO.

Piip, V.B "2D inversion of refraction traveltime curves using homogeneous functions", Geophysical Prospecting, Dec. 21, 2001, pp. 461-482, vol. 49, No. 4, Blackwell Science, Hoboken, USA.

Colombo, D. et al. "Fully automated near-surface analysis by surface-consistent refraction method", GEOPHYS, Jul. 1, 2016, vol. 81, No. 4, pages U39-U49.

\* cited by examiner

METHODS AND SEISMIC SHOT GENERATION AND DATA COLLECTION SYSTEMS UTILIZING REFRACTION IN HORIZONTAL STRATIFIED MEDIA FOR MONOTONICALLY INCREASED VELOCITY DETERMINATIONS

TECHNICAL FIELD

The present disclosure relates to geophysical data interpretation and, in particular, systems and methods for building a depth-domain monotonic velocity model for geophysical data interpretation by using refracted energy based on the semidefinite programming.

BACKGROUND

Seismic exploration involves the generation of raw seismic data by providing seismic energy at various points within a surveyed location. When propagating through the subsurface, the seismic energy may encounter various changes in subsurface properties (e.g., changes in density, porosity, and material). For example, the seismic energy may reflect back towards the surface at interfaces between various substrata or other discontinuities. Such reflections may have varying frequency, amplitude, and phase characteristics based on the nature of the discontinuity encountered by the seismic energy. By measuring these reflections, information regarding subsurface formations can potentially be obtained. For example, a plurality of receivers may be used to generate a plurality of traces, with each trace containing information regarding the reflections of the seismic energy propagating through the subsurface.

The process of deducing subsurface features from collected seismic data is known as geophysical data interpretation. Deduction of complex subsurface features (e.g., narrow strata) from raw seismic data is difficult because each trace may represent a combination of reflections from a plurality of different subsurface features. Accordingly, a need exists for an alternative deduction of complex subsurface features from raw seismic data that implements an efficient and accurate solution.

SUMMARY

According to subject matter of the present disclosure, a seismic shot generation and data collection system comprises a seismic source, a seismic receiver, a depth-domain velocity model, a monotonically increased velocity model, and a seismic data processor. The seismic source is configured to generate a seismic wave. The seismic receiver is configured to detect the seismic wave. The depth-domain velocity model comprises a plurality of inverse modeled velocities based on first arrival data from the seismic wave detected by the seismic receiver and a refraction velocity $v(z)$ associated with the plurality of inverse modeled velocities. The first arrival data comprises a plurality of time t and offset x values. The monotonically increased velocity model comprises a monotonically increased velocity $v^*(z)$. The seismic data processor is communicatively coupled to the depth-domain velocity model and the monotonically increased velocity model and is operable to receive the first arrival data from the seismic wave generated by the seismic source and detected by the seismic receiver, determine the plurality of inverse modeled velocities of the depth-domain velocity model based on the plurality of time t and offset x values of the first arrival data, and determine the refraction velocity $v(z)$ for an estimated depth z based on the plurality of inverse modeled velocities. The seismic data processor is further operable to determine the monotonically increased velocity $v^*(z)$ from the monotonically increased velocity model by requiring the monotonically increased velocity $v^*(z)$ to be nearest to the refraction velocity $v(z)$ and to be characterized by a positive slope such that the refraction velocity $v(z)$ increases with depth, and generate a subsurface image based on the estimated depth z and the determined monotonically increased velocity $v^*(z)$.

According to an embodiment of the present disclosure, a seismic shot generation and data collection system comprises a seismic source, a seismic receiver, a depth-domain velocity model, a monotonically increased velocity model, and a seismic data processor, and the seismic source is positioned to direct seismic energy into a subsurface region comprising geological discontinuities to generate a seismic wave. The seismic receiver is positioned to receive seismic energy that is redirected by the geological discontinuities through reflection, refraction, or a combination thereof to detect the seismic wave. The depth-domain velocity model comprises a plurality of inverse modeled velocities based on first arrival data from the seismic wave detected by the seismic receiver and a refraction velocity $v(z)$ associated with the plurality of inverse modeled velocities. The first arrival data comprises a plurality of time t and offset x values. The monotonically increased velocity model comprises a function, the function comprising a monotonically increased velocity $v^*(z)$. The seismic data processor is communicatively coupled to the depth-domain velocity model and the monotonically increased velocity model and is operable to receive the first arrival data from the seismic wave generated by the seismic source and detected by the seismic receiver, determine the plurality of inverse modeled velocities of the depth-domain velocity model based on the plurality of time t and offset x values of the first arrival data, and determine the refraction velocity $v(z)$ for an estimated depth z based on the plurality of inverse modeled velocities. The seismic data processor is further operable to determine the monotonically increased velocity $v^*(z)$ from the monotonically increased velocity model by optimizing the function to minimize error through requiring the monotonically increased velocity $v^*(z)$ to be nearest to the refraction velocity $v(z)$ and to be characterized by a positive slope such that the refraction velocity $v(z)$ increases with depth, and generate a subsurface image based on the estimated depth z and the determined monotonically increased velocity $v^*(z)$.

According to another embodiment of the present disclosure, a method comprises receiving first arrival data from a seismic wave generated by a seismic source and detected by a seismic receiver, determining a plurality of inverse modeled velocities of a depth-domain velocity model based on a plurality of time t and offset x values of the first arrival data, and determining a refraction velocity $v(z)$ for an estimated depth z based on the plurality of inverse modeled velocities. The method further comprises determining a monotonically increased velocity $v^*(z)$ from a monotonically increased velocity model by requiring the monotonically increased velocity $v^*(z)$ to be nearest to the refraction velocity $v(z)$ and to be characterized by a positive slope such that the refraction velocity $v(z)$ increases with depth, and generating a subsurface image based on the estimated depth z and the determined monotonically increased velocity $v^*(z)$.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In embodiments described herein, systems and methods are disclosed for building a depth-domain monotonic velocity model for geophysical data interpretation by using refracted energy based on the semidefinite programming. In seismology, first-arrival picking is the detection of onset arrivals refracted signals produced by a source signal generation and received via one or more receiver arrays. However, due to first-arrival picking bias on the low signal-to-noise ratio field data, a velocity returned without a monotonic assumption may not be guaranteed to be increased along with depth per a velocity rule. A semidefinite programming application as described herein is configured to generate a monotonically increased velocity model related to the refraction energy to align with the velocity rule, reducing noise and correcting bias. Embodiments of the present disclosure are directed to such systems and methods, as described in greater detail further below, to the improved monotonically increased velocity model related to the refraction energy to generate a more accurate velocity based on the velocity rule.

As used herein, the term "module" may refer to, be part of, or include: an Application Specific Integrated Circuit (ASIC); a digital, analog, or mixed analog/digital discrete or integrated circuit; a combinational logic circuit; a field programmable gate array (FPGA); a processor circuit that executes machine-readable instructions; a memory circuit that stores machine-readable instructions executed by the processor circuit; other suitable hardware components that provide the described functionality; or a combination of some or all of the above.

Figure 1:
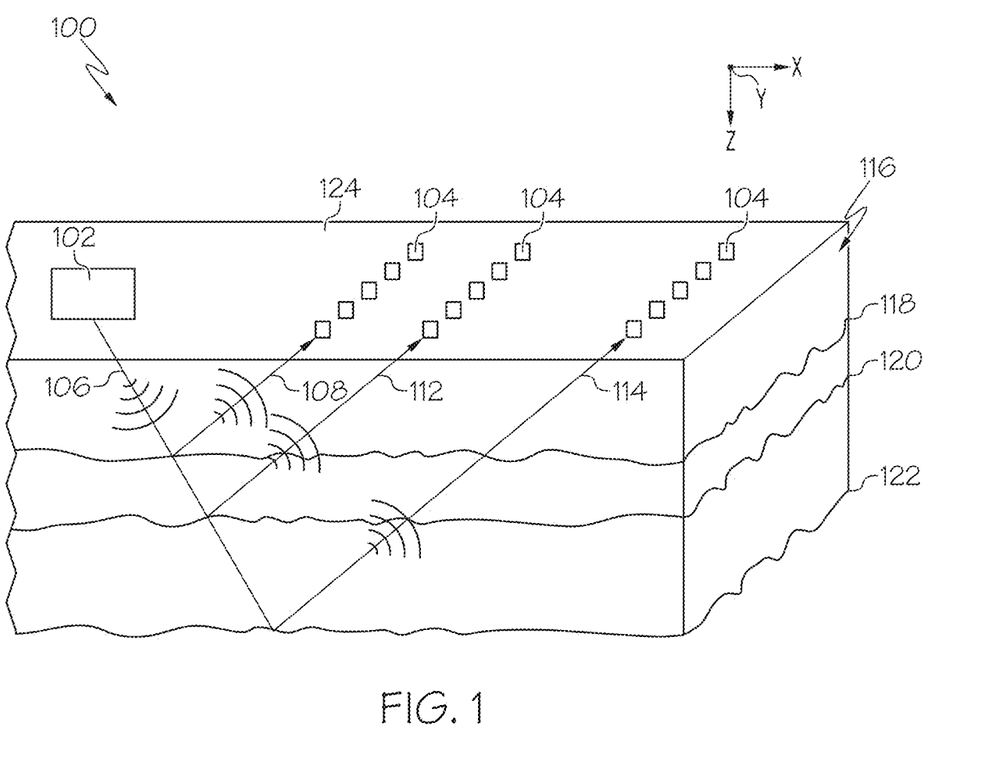
FIG. 1 schematically depicts a seismic data collection system, according to one or more embodiments shown and described herein.

Referring now to FIG. 1, a seismic data collection system 100 is depicted, according to an example embodiment. In embodiments, the seismic data collection system 100 is configured to collect seismic data to generate a geophysical image of a subsurface region 116. As depicted, the seismic data collection system 100 includes a seismic source 102 configured to generate a seismic wave through direction of seismic energy 106 into the subsurface region 116. The seismic data collection system 100 further includes a seismic receiver 104 as one or more receiver sensors configured to detect the seismic wave through receipt of reflections 108, 112, and 114 and/or refractions of the seismic energy 106 off of various geological discontinuities 118, 120, and 122. The seismic source 102 may include a sound generator configured to generate vibrational energy that propagates through the subsurface region 116. As non-limiting examples, the sound source may be an active sound source, such as a hammer and plate, a sound gun, or an explosive, or a passive sound source, such as thunder, or an indirect sound source like human activity.

In embodiments, the seismic source 102 is positioned to direct seismic energy into a subsurface region 116 comprising geological discontinuities 118, 120, and 122, and the seismic receiver 104 is positioned to receive seismic energy that is redirected by the geological discontinuities 118, 120, and 122 through reflection, refraction, or a combination thereof. Although concepts of the present disclosure are described with reference to a single seismic source 102 and/or seismic processor 104, it is contemplated by and within the scope of this disclosure that recited configurations of the seismic source 102 and/or seismic receiver 104 may be associated with a plurality of seismic sources 102 and/or seismic receiver 104. As a non-limiting example, a plurality of seismic receivers may be configured to operate as the seismic receiver 104 described herein.

In embodiments, the seismic source 102 may be movable (e.g., disposed on a truck, boat, or other motor vehicle) to produce seismic energy from a plurality of different locations on the surface 124 (e.g., along a line in an in-line direction—the x-direction in FIG. 1). In embodiments, the seismic data collection system 100 includes a plurality of seismic sources 102 disposed in an array (e.g., along a line in an in-line or the x-direction) to generate seismic data from a plurality of different orientations with respect to the geological discontinuities 118, 120, and 122.

The seismic receiver 104 may be one of a plurality of receivers 104 depicted to be arranged in a grid-like pattern. In embodiments, the receivers 104 are equally spaced in both the x-direction and the y-direction (e.g., the cross-line direction) to generate a uniform measurement of the subsurface region 116. In embodiments, the receivers 104 may have a non-uniform distribution or any distribution of any shape or configuration. The seismic data collection system 100 may include any number of receivers 104 depending on the implementation. The receivers 104 are generally configured to convert vibrations in the subsurface region 116 (e.g., caused by reflections 108, 112, and 114) into an electrical signal (e.g., a voltage) and store the electrical signal. Deviations of the electrical signals generated via the receivers 104 are measured as a seismic response of the subsurface region 116. The reflections 108, 112, and 114 may each induce separate seismic responses in each one of the receivers 104. In embodiments, the electrical signals generated and stored by each one of the receivers 104 over a time period comprises a separate seismic trace of the subsurface region 116. In embodiments, such seismic traces may be time sampled to generate the seismic data described herein.

Though source-receiver geometry for a single-ended spread survey is depicted in FIG. 1, it should be appreciated that the configuration depicted in FIG. 1 is exemplary only and that other source-receiver geometries associated with other survey types may also be used. The systems and methods described herein may be used to generate geophysical images of a subsurface region using seismic data gathered through any technique.

Geological discontinuities 118, 120, and 122 may take various forms depending on the nature of the subsurface region 116. The geological discontinuities 118, 120, and 122 may cause variations in the seismic responses measured by the receivers 104 (e.g., due to reflections 108, 112, and 114 and refractions as described herein). For example, the geological discontinuities 118, 120, and 122 may comprise a variation in stratigraphy (e.g., subsurface layers of different composition), structure (e.g., a fault or a channel), porosity, and the presence of subsurface hydrocarbons. Accurate knowledge of all of the geological discontinuities 118, 120, and 122 within the subsurface region 116 are important for certain applications, such as petroleum exploration, because such discontinuities may be directly correlated with the formation of subsurface traps for hydrocarbons.

It is difficult to obtain accurate knowledge of the geological discontinuities 118, 120, and 122 using raw data measured via receivers 104. Raw seismic data obtained directly from the receivers 104 is typically noisy. Additionally, each trace measured via the receivers 104 may contain information pertaining to a plurality of different reflections. Absent a model of the subsurface region containing specific reflection coefficients accurately representing the geological discontinuities 118, 120, and 122, an image containing each of the raw traces measured via the receivers 104 may contain little usable information. Accordingly, geophysical data interpretation relies on various image processing techniques to enhance the raw data and generate images containing useful information.

Figure 2:
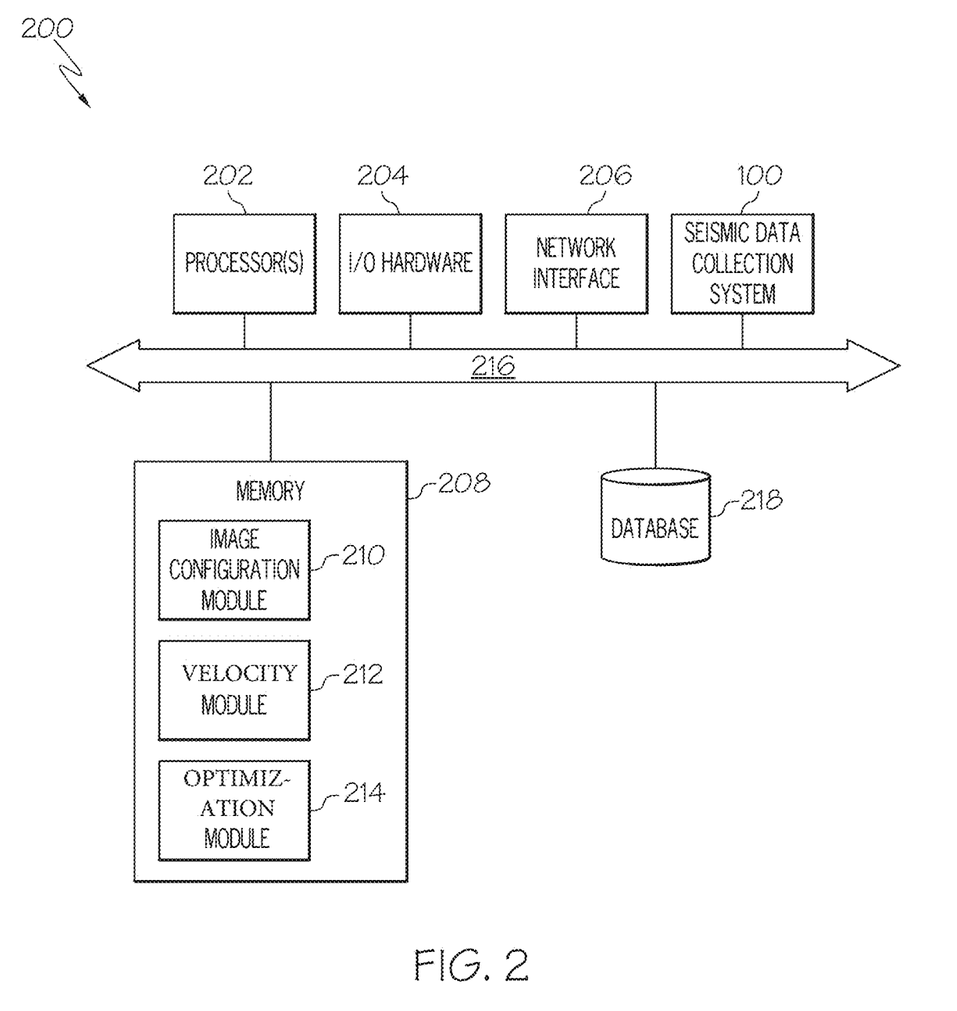
FIG. 2 schematically depicts a seismic imaging system for use with the seismic data collection system of FIG. 1 and processes described herein such as a process of FIG. 6, according to one or more embodiments shown and described herein.

With reference to FIG. 2, an example embodiment of a seismic shot generation and data collection system 200 is depicted. The seismic shot generation and data collection system 200 is generally configured to generate a seismic image of the subsurface region 116 from raw geophysical data, such as the seismic traces collected via seismic data collection system 100 described herein with respect to FIG. 1. As depicted, the seismic shot generation and data collection system 200 includes a processor 202, input/output ("I/O") hardware 204, a network interface 206, a communications bus 216, a memory 208, and a database 218. Although concepts of the present disclosure are described with reference to a single processor 202, it is contemplated by and within the scope of this disclosure that processing functions of the processor 202 may be performed by a plurality of processors 202.

The seismic shot generation and data collection system 200 is communicatively coupled through the communications bus 216, whether in a wired or wireless connection, to the processor 202, input/output ("I/O") hardware 204, network interface 206, memory 208, database 218, a server, a network, and a computing device. The seismic shot generation and data collection system 200 may include multiple servers containing one or more applications and computing devices. In some embodiments, the seismic shot generation and data collection system 200 is implemented using a wide area network (WAN) or network 322, such as an intranet or the internet. The computing device may include digital systems and other devices permitting connection to and navigation of the network of the seismic shot generation and data collection system 200. It is contemplated and within the scope of this disclosure that the computing device may be a personal computer, a laptop device, a smart mobile device such as a smartphone or smart pad, or the like. Other seismic shot generation and data collection system 200 variations allowing for communication between various geographically diverse components are possible. The lines depicted in FIG. 2 indicate communication rather than physical connections between the various components.

The seismic shot generation and data collection system 200 may include a display such as a graphical user interface (GUI) on a screen of the computing device for providing visual output such as, for example, information, graphical reports, messages, or a combination thereof. The display on the screen of the computing device is coupled to the communications bus 216 and communicatively coupled to the processor 202. Accordingly, the communications bus 216 communicatively couples the display to other modules of the seismic shot generation and data collection system 200. The display can comprise any medium capable of transmitting an optical output such as, for example, a cathode ray tube, light emitting diodes, a liquid crystal display, a plasma display, or the like. Additionally, it is noted that the computing device can comprise the processor 202, the memory component 208, or both. While the seismic shot generation and data collection system 200 is illustrated as a single, integrated system in FIG. 2, in other embodiments, the systems can be independent systems.

The communications bus 216 may be a communications path formed from any medium that is capable of transmitting a signal such as, for example, conductive wires, conductive traces, optical waveguides, or the like, or from a combination of mediums capable of transmitting signals. The communications bus 216 communicatively couples the various components of the seismic shot generation and data collection system 200. As used herein, the term "communicatively coupled" means that coupled components are capable of exchanging data signals with one another such as, for example, electrical signals via conductive medium, electromagnetic signals via air, optical signals via optical waveguides, and the like.

In the depicted example, the seismic shot generation and data collection system 200 also includes the seismic data collection system 100 described with respect to FIG. 1. For example, in embodiments, the seismic shot generation and data collection system 200 may comprise a computing system connected to the plurality of receivers 104 of the seismic data collection system 100 to generate geophysical images based on the seismic signals generated via the plurality of receivers 104 in real-time as the data is collected. In embodiments, the seismic shot generation and data collection system 200 may communicate with the seismic data collection system 100 over a network via the network interface 206 to receive the data collected via the seismic data collection system 100. In embodiments, the seismic shot generation and data collection system 200 does not communicate with the seismic data collection system 100 and seismic data may be uploaded to the seismic shot generation and data collection system 200 via the I/O hardware 204.

While the seismic shot generation and data collection system 200 is depicted to include a single processor 202, it should be appreciated that the seismic shot generation and data collection system 200 may include any number of processors depending on the implementation. The processor 202 can include any suitable processing device, such as a microprocessor, microcontroller, integrated circuit, logic device, a microchip, a computer, and/or other suitable processing device. In embodiments, the processor 202 is a processing circuit (e.g., either a single processing circuit or a group processing circuit) that executes some or all of the machine-readable instructions from multiple modules of one or more non-transitory computer-readable mediums (e.g., the memory 208). The processor 202 can be any device capable of executing machine readable instructions. The processor 202 is communicatively coupled to the other components of the the seismic shot generation and data collection system 200 by the communications bus 216. Accordingly, the communications bus 216 may communicatively couple any number of processors with one another, and allow the modules coupled to the communications bus 216 to operate in a distributed computing environment. Specifically, each of the modules can operate as a node that may send and/or receive data.

I/O hardware 204 may include one or more elements that receive inputs from a user and/or provide results of the computations performed via the seismic shot generation and data collection system 200 to a user. For example, in embodiments, the I/O hardware 204 may include a basic input/output system (BIOS) that interacts with hardware of the seismic shot generation and data collection system 200, device drivers that interact with particular devices of the seismic shot generation and data collection system 200, one or more operating systems, user applications, background services, background applications, and the like. The network interface 206 can include any suitable components for interfacing with one or more network(s), including for example, transmitters, receivers, ports, controllers, antennas, and/or other suitable components. The network interface 206 may include and/or be configured to communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The seismic shot generation and data collection system 200 comprises such network interface hardware for communicatively coupling with a computer network, and the network interface hardware is coupled to the communications bus 216 such that the communications bus 216 communicatively couples the network interface hardware to other modules of the seismic shot generation and data collection system 200. The network interface hardware can be any device capable of transmitting and/or receiving data via a wireless network. Accordingly, the network interface hardware can comprise a communication transceiver for sending and/or receiving data according to any wireless communication standard.

Data from various applications running on the computing device of the seismic shot generation and data collection system 200 can be provided via the network interface hardware. The computing device can be any device having hardware (e.g., chipsets, processors, memory, etc.) for communicatively coupling with the network interface hardware and a network. Specifically, the computing device can comprise an input device having an antenna for communicating over one or more of the wireless computer networks described above.

The network can comprise any wired and/or wireless network such as, for example, wide area networks, metropolitan area networks, the internet, an intranet, satellite networks, or the like. Accordingly, the network can be utilized as a wireless access point by the computing device to access one or more servers, which generally comprise processors, memory, and chipset for delivering resources via the network. Resources can include providing, for example, processing, storage, software, and information from the server to the seismic shot generation and data collection system 200 via the network. Additionally, it is noted that the server and any additional servers can share resources with one another over the network such as, for example, via the wired portion of the network, the wireless portion of the network, or combinations thereof.

The database 218 may generally comprise a data storage component communicably coupled to the processor 202 via the communication bus 216. As a non-limiting example, the database 218 may include one or more database servers that support NoSQL, MySQL, Oracle, SQL Server, NewSQL, and/or the like.

The seismic data collection system 100 of FIG. 1 may be communicatively coupled to a "big data" environment including the database 218 configured to store and process large volumes of data in such an environment. The database 218 may be, for example, a structured query language (SQL) database or a like database that may be associated with a relational database management system (RDBMS) and/or an object-relational database management system (ORDBMS). The database 218 may be any other large-scale storage and retrieval mechanism whether a SQL, SQL including, or a non-SQL database. For example, the database 218 may utilize one or more big data storage computer architecture solutions. Such big data storage solutions may support large data sets in a hyperscale and/or distributed computing environment, which may, for example, include a variety of servers utilizing direct-attached storage (DAS). Such database environments may include Hadoop, NoSQL, and Cassandra that may be usable as analytics engines. Thus, while SQL may be referenced herein as an example database that is used with the tool described herein, it is understood that any other such type of database capable of supporting large amounts of data, whether currently available or yet-to-be developed, and as understood to those of ordinary skill in the art, may be utilized with the tool described herein as well.

The memory 208 is communicatively coupled to the processor 202. As a non-limiting example, the memory 208 may comprise one or more non-transitory computer-readable mediums that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components capable of storing machine readable instructions such that the machine readable instructions can be accessed and executed by the processor 202. Memory 208 may store instructions accessible to the processor 202 via an addressing scheme such that the processor 202 may access the memory 208 to execute the instructions in accordance with a program to perform any of the functions and operations described herein. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The memory 208 is depicted to include an image configuration module 210, a velocity module 212, and an optimization module 214. It should be appreciated that these modules are exemplary only and that the memory 208 may include any number of modules to perform the various functions of the seismic shot generation and data collection system 200 described herein and the functions performed by the image configuration module 210, the velocity module 212, and the optimization module 214 may be performed by any other module consistent with the present disclosure.

The image configuration module 210 is configured to generate image parameters based on a seismic data to be used by the seismic shot generation and data collection system 200 to generate a geophysical image. A size of the subsurface region to be imaged may be determined based on characteristics of the seismic data used to generate the image (e.g., received from the seismic data collection system 100). For example, in embodiments, the size of the subsurface region to be imaged may depend on the number of receivers used to collect seismic data (e.g., a number of available seismic traces).

In embodiments, the image configuration module 210 may generate parameters for the geophysical image based on inputs received from the user. For example, in embodiments, a user may identify a set geological continuities desired to be imaged and the image configuration module may generate a set of image parameters based on the identified set of geological discontinuities. In embodiments, the user may also input a desired size of subsurface region to be imaged. In embodiments, the image configuration module 210 may automatically generate a plurality of sets of image parameters used by the velocity module 212 and the optimization module 214 to generate a plurality of geophysical images using each set of image parameters.

In embodiments, the image configuration module 210 may also perform various pre-processing steps on received seismic data. For example, in embodiments, the image configuration module 210 may include noise removing filters or the like to smoothen the received seismic data prior to processing via the velocity module 212 and the optimization module 214. As a non-limiting example, data preprocessing such as noise attenuation and/or amplitude balancing between reflection- and refraction-based energy may be utilized by the image configuration module 210. The velocity module 212 and the optimization module 214 are configured to apply further processing to remove noise through accurate determinations to minimize a constrained optimization problem in a dual-primal application involving maximum and minimum constraints to reduce error as described herein. In embodiments, other data corrections, such as the normal moveout correction and dip steering, may also be performed via the image configuration module 210.

Still referring to FIG. 2, as noted above, the seismic shot generation and data collection system 200 comprises the image configuration module 210, the velocity module 212, and the optimization module 214, as described above, to at least apply data analytics and artificial intelligence algorithms and models, which may include machine learning, to received input data. The machine learning model may include an artificial intelligence component to train and provide machine learning capabilities to a neural network as described herein. By way of example, and not as a limitation, a convolutional neural network (CNN) and/or a recurrent neural network (RNN) may be utilized. The processor 202 may process the input signals received from the system modules and/or extract information from such signals.

Data stored and manipulated in the seismic shot generation and data collection system 200 as described herein is utilized by the machine learning model, which is able to leverage a cloud computing-based network configuration such as the cloud to apply machine learning and artificial intelligence. This machine learning application may create models that can be applied by the seismic shot generation and data collection system 200 to make it more efficient and intelligent in execution. As an example and not a limitation, the artificial intelligence and/or machine learning models may include artificial intelligence components selected from the group consisting of an artificial intelligence engine, Bayesian inference engine, and a decision-making engine, and may have an adaptive learning engine further comprising a deep neural network learning engine.

Figure 6:
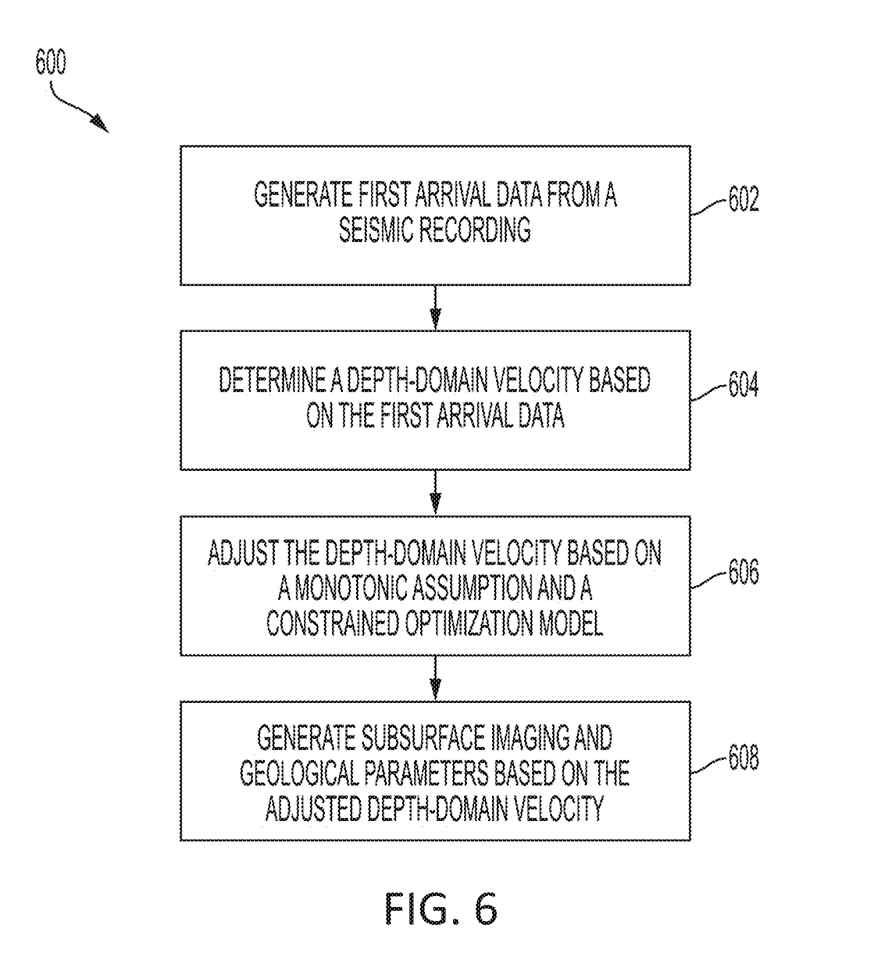
FIG. 6 illustrates a flowchart of a process to use with the seismic imaging system of FIG. 2, according to one or more embodiments shown and described herein.

In an embodiment, the seismic shot generation and data collection system 200 may include machine readable instructions stored in the memory component 208 communicatively coupled to the processor 202 as a seismic data processor 202 to implement a control scheme such as the process 600 of FIG. 6, which is described in greater detail further below. As described herein, the seismic shot generation and data collection system 200 may include the seismic source 102, the seismic receiver 104, a depth-domain velocity model, a monotonically increased velocity model, and the seismic data processor 202.

Referring to FIGS. 3-6, a process 600 is described to build a depth-domain monotonic velocity model from the depth-domain velocity model and the monotonically increased velocity model by using refracted energy based on semi-definite programming. The depth-domain velocity model comprises a plurality of inverse modeled velocities based on first arrival data from the seismic wave detected by the seismic receiver and a refraction velocity $v(z)$ associated with the plurality of inverse modeled velocities, and the first arrival data includes a plurality of time t and offset x values. The monotonically increased velocity model includes a function, which includes a monotonically increased velocity $v^*(z)$. Further, the seismic data processor 202 is communicatively coupled to the depth-domain velocity model and the monotonically increased velocity model and is operable to implement the control scheme of the process 600 of FIG. 6.

Figure 3:
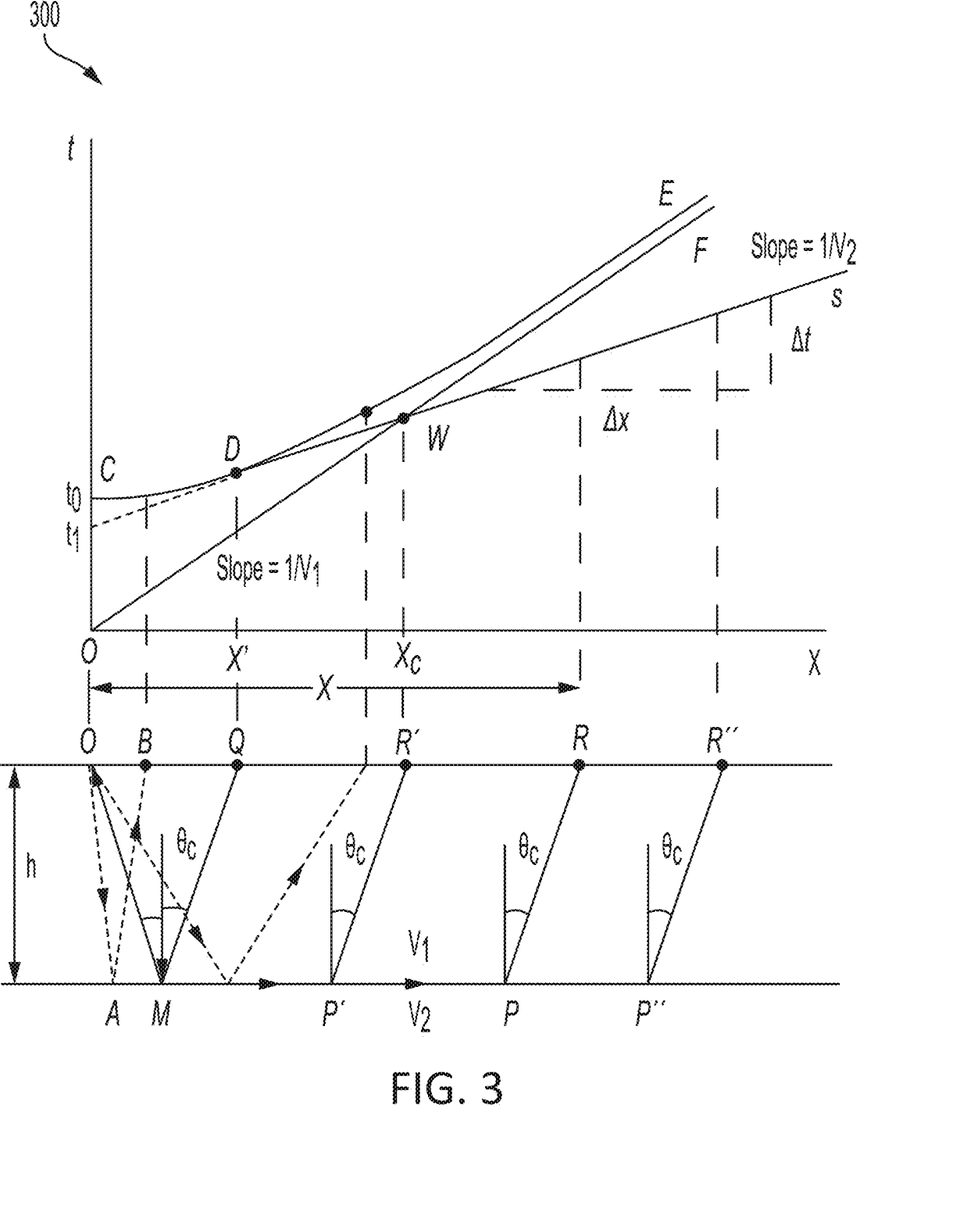
FIG. 3 illustrates a graphical depiction of a time-offset plot to utilize with a velocity model of the seismic imaging system of FIG. 2.
Figure 4:
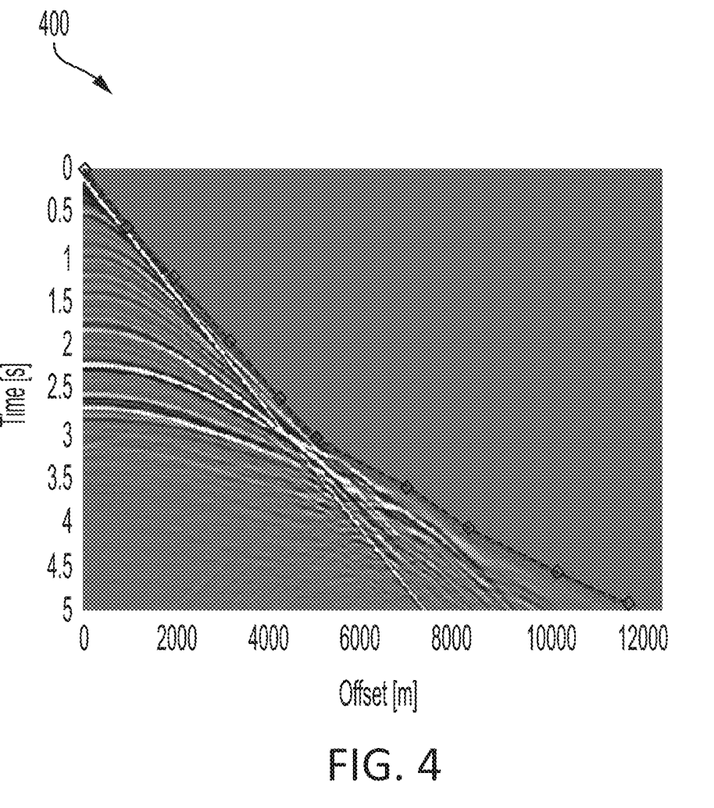
FIG. 4 illustrates a depiction of a shot of a gathering from a seismic recording utilizing the seismic imaging system of FIG. 2.

In block 602, first arrival data from a seismic recording is generated as depicted in a time-offset plot 300 of FIG. 3. The first arrival data is received from the seismic wave generated by the seismic source 102 and detected by the seismic receiver 104. By way of example, and not as a limitation, a seismic shot record is gathered and first arrivals are provided by a manual and/or an automatic picking methodology such as through use of the image configuration module 210 of FIG. 2. A seismic shot record $u(t, x)$ is collected (e.g., recorded) in the time-offset domain such that seismic traces are assembled as a function of offset (e.g., the distance between the source 102 and receiver 104 locations) over time. Referring to FIG. 4, a shot 400 is shown of a gathering of first-arrival picks from a seismic recording, the first-arrival picks corresponding to an outer edge plotted curve intersecting diamond shaped markings of offset in meters compared to time in seconds.

Referring again to FIG. 3, the time-offset plot 300 depicts a relation between such reflection and refraction ray paths and travel time curves of generated first-arrival data. When a P-wave is refracted at a horizontal interface between two layers of different velocities $v_1$ and $v_2$, where $v_2 > v_1$, the path of the refracted wave is OMPR, and $\theta_c$ is the critical angle. In addition to the head wave, a direct wave travels directly from the source to the receiver, that is, along the line OR" in FIG. 3. Near the source the direct wave arrives before the refraction, but eventually the higher-velocity path of the refraction allows it to overtake the direct wave at point R', is the crossover point. The refraction exists at offsets greater than the critical distance OQ and, between Q and R', is often obscured by the earlier direct wave.

In block 604, a depth-domain velocity is determined based on the first arrival data, such as through use of the velocity module 212. The plurality of inverse modeled velocities of the depth-domain velocity model may be determined based on the plurality of time t and offset x values of the first arrival data. The refraction velocity v(z) for an estimated depth z may be determined based on the plurality of inverse modeled velocities. As a non-limiting example, a depth-domain velocity model is computed based on a refraction method shown in FIG. 3. However, the first arrivals may not guarantee the basic rule of refraction seismology that, for a head wave to be generated, a velocity below an interface must be higher than that above the interface.

For a two-layer model as in FIG. 3, the travel time curve for the refraction from a horizontal refractor at depth h is, as set forth in EQUATIONS 1 and 2 below.

$$t = \frac{x}{v_2} + t_1 \quad \text{(EQUATION 1)}$$

$$t_1 = \frac{2h \cos\theta_c}{v_1} \quad \text{(EQUATION 2)}$$

In EQUATION 1 above, x is the offset, such as in terms of distance, wherein distance traveled over time is indicative of speed as reflected in the velocity calculation of speed in a direction of travel. Further, h is a height of a subsurface discontinuity (e.g., geological discontinuities 118, 120, and 122) to a surface of the subsurface region 116. The travel time refraction curve s is a straight line of slope $1/v_2$ with a projected intercept on the t-axis equal to $t_1$. The slope of the direct-wave travel time curve F gives $v_1$, while that of the refraction curve s gives $v_2$. Although the refraction curve s does not extend to the t-axis, the refraction curve s can be projected to determine the intercept $t_1$. Thus, an angle $\theta_c = \sin^{-1}(v_1/v_2)$ may be determined to generate the depth h from EQUATION 2.

When there are more than one refracting horizons, the time-distance curve for each refraction horizon is a straight line whose slope is the reciprocal of the velocity just below the refracting horizon and whose intercept $t_i$ is the sum of terms of the form $2h_1 \cos\theta_i/v_i$, as indicated by EQUATION 2, with each layer above the refracting horizon contributing one term. EQUATION 3 below thus results from a generalization of EQUATIONS 1 and 2 to n layers:

$$t = \frac{x}{v_n} + \sum_{i=1}^{n-1} \frac{2h_i}{v_i} \cos\theta_i \quad \text{(EQUATION 3)}$$

In EQUATION 3 above, an angle $$\theta_i = \sin^{-1}\frac{v_i}{v_n}.$$

Thus, velocities $v_i$ may be determined from slopes as described above, such as the slope of the direct-wave curve F to give $v_1$ for the first layer and the slopes of the refraction curves s to give $v_2$ to $v_n$ respectively for the remaining n layers. EQUATION 3 can further be used to determine corresponding thicknesses $h_i$ of each of a series of horizontal refracting layers up to an nth layer, each of constant velocity higher than any of the layers above it. Each layer should contribute sufficiently to the time-distance curve to permit the layer to be analyzed correctly. As described above, the velocities $v_i$ may be determined by measuring slopes of the various sections of the time-distance curve, time (t) intercepts of the associated time-distance curves may be determined, and corresponding thicknesses $h_i$ of each layer i of the layers n may be determined from t intercepts.

The determined velocity-thickness pairs $(v_i, h_i)$, i=1, . . . , n, can be stored in and extended to a depth-domain velocity model as shown in EQUATION 4 below, in which for a thickness value of z (e.g., as a height value in meters) of the subsurface region 116, subject to the constraints set forth below, a velocity may be determined.

$$v(z) = \begin{cases} v_1 \\ v_i \end{cases} \quad \text{where for} \quad \text{(EQUATION 4)}$$

$$0 \leq z \leq h_1, v(z) = v_1 \text{ and for}$$

$$\sum_{k=1}^{i-1} h_k \leq z \leq \sum_{k=1}^{i} h_k, v(z) = v_i.$$

Thus, for an estimated thickness z (e.g., as an estimated depth) that is between 0 and a first layer thickness $h_i$, the estimated velocity is equivalent to the determined velocity $v_1$ for the first layer thickness $h_i$. Further, for an estimated thickness z that is greater than the first layer thickness $h_i$, the estimated velocity v(z) is equivalent to the determined velocity $v_i$ for the ith layer thickness $h_i$.

A velocity $v_i$ and a velocity $v_1$ (where i is an ith one of n layers) for the refraction velocity v(z) may be inverse modeled through EQUATIONS 3 AND 4, where time t and offset x are determined from one or more first-arrival pickings of seismology data. Further, a depth $h_1$ may be determined as the estimated depth z.

In block 606, the depth-domain velocity is adjusted based on a monotonic assumption and a constrained optimization model including one or more constraints and a constrained optimization problem to solve as employed via a semidefinite programming technique, such as through use of the optimization module 214. The monotonically increased velocity v*(z) may thus be determined from the monotonically increased velocity model by requiring the monotonically increased velocity v*(z) to be nearest to the refraction velocity v(z) and to be characterized by a positive slope such that the refraction velocity v(z) increases with depth. The monotonic assumption is based on a rule that a velocity related to refraction energy increases downward monotonically. The monotonic assumption is added to the depth-domain velocity model and the semidefinite programming technique is used to correct the velocity model returned by the refraction method. Thus, rather than relying on accuracy of first-arrival data to generate reliable depth-domain velocity model, the seismic shot generation and data collection system 200 is configured through the process 600 to automatically modify and/or correct velocity reversals that may be caused by a low signal-to-noise data and picking bias and that would otherwise not provide accurate first-arrival data.

In embodiments, a monotonically increased velocity v*(z) of a monotonically increased velocity model is determined through the linear function below as an adjusted velocity that is nearest to the refraction velocity v(z) computed by EQUATION 4 as being obtained by solving a semidefinite programming constrained optimization problem with constraints as set forth below. Through semidefinite programming, a linear function as a convex optimization problem is minimized to produce a minimum error result (e.g., f(z)) subject to ("s.t.") a constraint that an affine combination of symmetric matrices is positive semidefinite. The linear function set forth below describes a matrix norm function that solves for a minimization of a squared Frobenius norm to reduce error based on a difference between the matrices of adjusted velocity v*(z) and computed refraction velocity v(z) in a feasible region with the positive semidefinite constraint of a positive slope of the adjusted velocity v*(z) with respect to the estimated thickness z.

$$f(z) = \min \|v^*(z) - v(z)\|_2^2$$
$$\text{s.t. } \frac{dv^*(z)}{dz} \geq 0$$

Thus, in an embodiment subject to a positive slope, a minimum positive gradient can be determined to solve the monotonically increased velocity model and constrained optimization problems using EQUATION 4 and the constrained semidefinite programming set forth above. The seismic data processor 202 may thus be configured to optimize the function based on the first arrival data to minimize error and determine the monotonically increased velocity v*(z).

Figure 5:
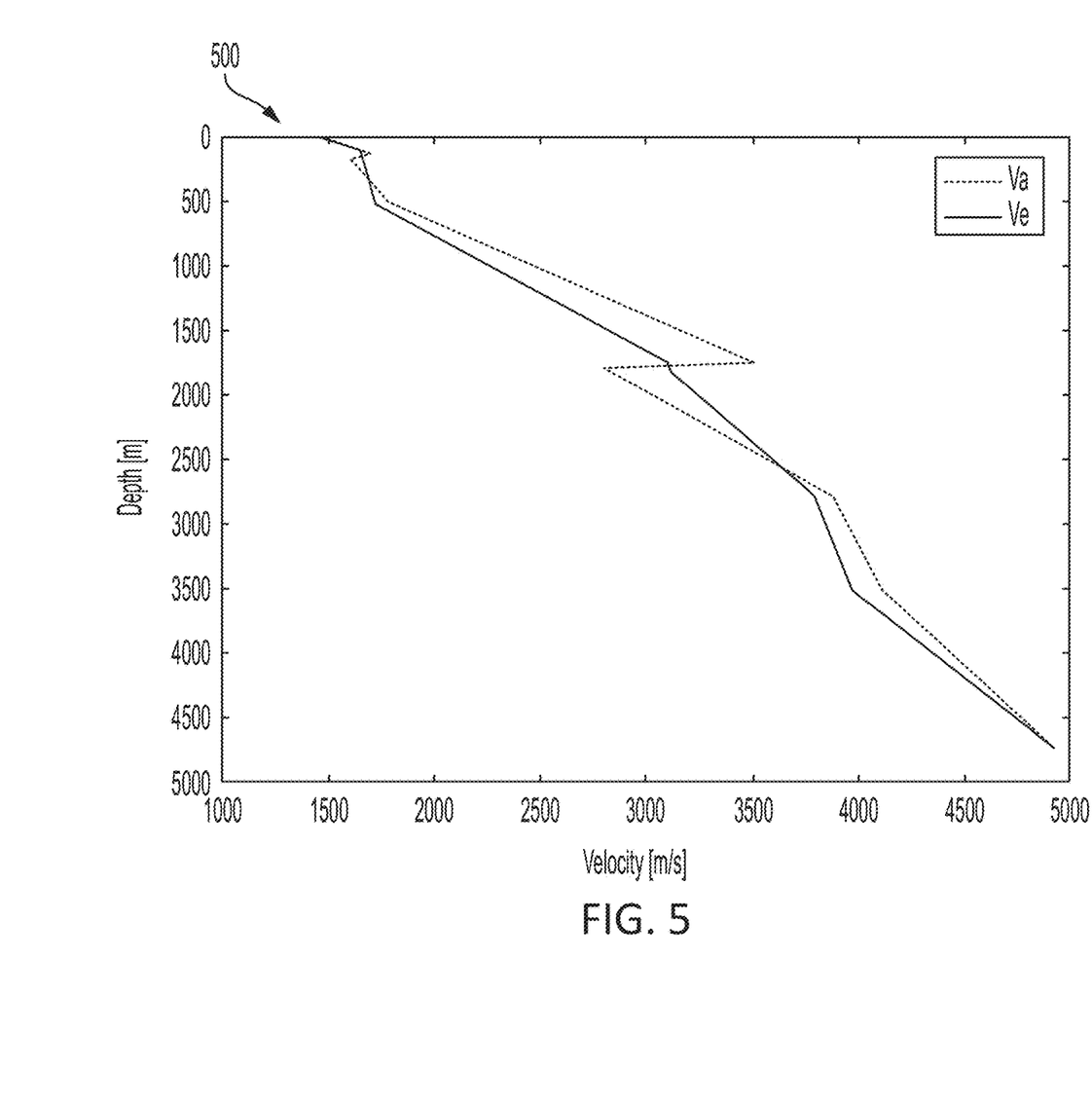
FIG. 5 illustrates a graphical depiction of a velocity per depth plot generated utilizing the seismic imaging system of FIG. 2 and the velocity model of FIG. 3.

A resulting picked constant gradient velocity associated with the refracted first-arrivals may then be used in an inversion scheme to derive an accurate near-surface velocity model, which is important in subsurface imaging and geological characterization. Referring to FIG. 5, a velocity per depth plot 500 is shown in which a velocity curve labeled Va is indicative of the velocity computed by the refraction method of EQUATIONS 3 AND 4, and a velocity curve labeled Ve is indicative of the monotonically increased velocity after first-arrival correction, improved accuracy, and corresponding reduced error via use of the linear function in block 606. As shown in the velocity per depth plot 500, the velocity curve labeled Va has more outlier points indicating a less accurate velocity than the velocity curve labeled Ve.

In block 608, subsurface imaging and geometric parameters may be generated based on the adjusted depth-domain velocity of the depth-domain velocity model using the semidefinite programming technique and as determined in block 606. Thus, a subsurface image may be generated based on the estimated depth z and the determined monotonically increased velocity v*(z).

As described herein refracted energy associated with a base of the weathering layer often constitutes the first arrivals on a shot gather, such as shown in FIG. 4. The shot gather references a collection of seismic traces that share a common geometric attribute such that, for example, the shot gather may indicate a common image point or common mid-point as the common geometric attribute. Shot gathers may be filtered from seismic field recordings to examine gather parameters, such as dependence on amplitude from a source sensor, a signal to noise ratio, a normal moveout indicative of an effect of distance between a seismic source and receiver (as an offset) on arrival time of a reflection (e.g., as an increase of time with offset), frequency, phase, an offset, incidence angle, azimuth, and other suitable seismic and/or geometric parameters. A method to compute the refraction velocity from the slopes of the travel time-versus-offset curves may utilize EQUATIONS 3 and 4. Due to a potential first-arrival picking bias on the low signal-to-noise ratio field data, the velocity returned from EQUATIONS 3 and 4 may not be guaranteed to be increased along with depth per a velocity rule. The linear function described above may be used to provide a correction by semidefinite programming such that a monotonically increased velocity model related to the refraction energy provides a returned velocity based on the velocity rule to improve velocity determination accuracy and reduce velocity determination error. In embodiments herein, the use of semidefinite programming through the linear function as a constrained optimization problem used in refraction seismology as described herein to generate a monotonically increased depth-domain velocity model permits such an improved velocity determination accuracy and reduced velocity determination error and resulting improved computational processing, for example, as images of improved accuracy may be generated based on such reduced error velocities.

It is also noted that recitations herein of "one or more" components, elements, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A seismic shot generation and data collection system comprising a seismic source, a seismic receiver, a depth-domain velocity model, a monotonically increased velocity model, and a seismic data processor, wherein:
the seismic source is configured to generate a seismic wave;
the seismic receiver is configured to detect the seismic wave;
the depth-domain velocity model comprises a plurality of inverse modeled velocities based on first arrival data from the seismic wave detected by the seismic receiver and a refraction velocity v(z) associated with the plurality of inverse modeled velocities;
the first arrival data comprises a plurality of time t and offset x values;
the monotonically increased velocity model comprises a monotonically increased velocity v*(z); and
the seismic data processor is communicatively coupled to the depth-domain velocity model and the monotonically increased velocity model and is operable to
receive the first arrival data from the seismic wave generated by the seismic source and detected by the seismic receiver,
determine the plurality of inverse modeled velocities of the depth-domain velocity model based on the plurality of time t and offset x values of the first arrival data,
determine the refraction velocity v(z) for an estimated depth z based on the plurality of inverse modeled velocities,
determine the monotonically increased velocity v*(z) from the monotonically increased velocity model by requiring the monotonically increased velocity v*(z) to be nearest to the refraction velocity v(z) and to be characterized by a positive slope such that the refraction velocity v(z) increases with depth, and
generate a subsurface image based on the estimated depth z and the determined monotonically increased velocity v*(z).

2. The system of claim 1, wherein:
the seismic source is positioned to direct seismic energy into a subsurface region comprising geological discontinuities; and
the seismic receiver is positioned to receive seismic energy that is redirected by the geological discontinuities through reflection, refraction, or a combination thereof.

3. The system of claim 1, wherein the seismic data collection system comprises a plurality of seismic receivers configured to operate as the seismic receiver.

4. The system of claim 1, wherein the monotonically increased velocity model comprises a function comprising the monotonically increased velocity v*(z), and the seismic data processor is configured to optimize the function based on the first arrival data to minimize error and determine the monotonically increased velocity v*(z).

5. The system of claim 4, wherein the function comprises:

$$f(z) = \min \|v^*(z) - v(z)\|_2^2,$$

subject to $\frac{dv^*(z)}{dz} \geq 0.$

6. The system of claim 1, wherein the machine-readable instructions, when executed, cause the one or more processors to:
determine a depth $h_i$ as the estimated depth z.

7. A seismic shot generation and data collection system comprising a seismic source, a seismic receiver, a depth-domain velocity model, a monotonically increased velocity model, and a seismic data processor, wherein:
the seismic source is positioned to direct seismic energy into a subsurface region comprising geological discontinuities to generate a seismic wave;
the seismic receiver is positioned to receive seismic energy that is redirected by the geological discontinuities through reflection, refraction, or a combination thereof to detect the seismic wave;
the depth-domain velocity model comprises a plurality of inverse modeled velocities based on first arrival data from the seismic wave detected by the seismic receiver and a refraction velocity v(z) associated with the plurality of inverse modeled velocities;
the first arrival data comprises a plurality of time t and offset x values;
the monotonically increased velocity model comprises a function, the function comprising a monotonically increased velocity v*(z); and
the seismic data processor is communicatively coupled to the depth-domain velocity model and the monotonically increased velocity model and is operable to
receive the first arrival data from the seismic wave generated by the seismic source and detected by the seismic receiver,
determine the plurality of inverse modeled velocities of the depth-domain velocity model based on the plurality of time t and offset x values of the first arrival data,
determine the refraction velocity v(z) for an estimated depth z based on the plurality of inverse modeled velocities,
determine the monotonically increased velocity v*(z) from the monotonically increased velocity model by optimizing the function to minimize error through requiring the monotonically increased velocity v*(z) to be nearest to the refraction velocity v(z) and to be characterized by a positive slope such that the refraction velocity v(z) increases with depth,
generate a subsurface image based on the estimated depth z and the determined monotonically increased velocity v*(z).

8. The system of claim 7, wherein the seismic data collection system comprises a plurality of seismic receivers configured to operate as the seismic receiver.

9. The system of claim 7, wherein the function comprises:

$$f(z) = \min \|v^*(z) - v(z)\|_2^2,$$

subject to $\frac{dv^*(z)}{dz} \geq 0.$

10. The system of claim 7, wherein the machine-readable instructions, when executed, cause the one or more processors to:
generate a depth $h_i$ as the estimated depth z.

11. A method comprising:
receiving first arrival data from a seismic wave generated by a seismic source and detected by a seismic receiver,
determining a plurality of inverse modeled velocities of a depth-domain velocity model based on a plurality of time t and offset x values of the first arrival data,
determining a refraction velocity v(z) for an estimated depth z based on the plurality of inverse modeled velocities,
determining a monotonically increased velocity v*(z) from a monotonically increased velocity model by requiring the monotonically increased velocity v*(z) to be nearest to the refraction velocity v(z) and to be characterized by a positive slope such that the refraction velocity v(z) increases with depth, and
generating a subsurface image based on the estimated depth z and the determined monotonically increased velocity v*(z).

12. The method of claim 11, wherein:
positioning the seismic source to direct seismic energy into a subsurface region comprising geological discontinuities; and
positioning the seismic receiver to receive seismic energy that is redirected by the geological discontinuities through reflection, refraction, or a combination thereof.

13. The method of claim 11, wherein the monotonically increased velocity model comprises a function comprising the monotonically increased velocity v*(z), and the method further comprising optimizing the function based on the first arrival data to minimize error and determine the monotonically increased velocity v*(z).

14. The system of claim 13, wherein the function comprises:

$$f(z) = \min \|v^*(z) - v(z)\|_2^2,$$
$$\text{subject to } \frac{dv^*(z)}{dz} \geq 0.$$

* * * * *